(12) United States Patent
Nasu et al.

(10) Patent No.: US 6,512,728 B1
(45) Date of Patent: Jan. 28, 2003

(54) OPTICAL STORAGE DEVICE AND CARTRIDGE LOADING MECHANISM

(75) Inventors: Hideo Nasu, Kawasaki (JP); Yoshiaki Hosokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/409,177

(22) Filed: Sep. 30, 1999

(30) Foreign Application Priority Data

Mar. 26, 1999 (JP) .......................................... 11-083062

(51) Int. Cl.$^7$ .............................................. G11B 33/02
(52) U.S. Cl. ..................................................... 369/75.2
(58) Field of Search .............................. 369/75.2, 75.1, 369/77.1, 77.2, 13, 191; 360/99.2, 99.06

(56) References Cited

U.S. PATENT DOCUMENTS

| | | | | |
|---|---|---|---|---|
| 5,515,357 A | * | 5/1996 | Arata et al. ................... 369/191 |
| 5,815,470 A | * | 9/1998 | Ohmuri et al. ................ 369/13 |
| 6,002,659 A | * | 12/1999 | Ogusu et al. ............... 369/75.1 |
| 6,014,358 A | * | 1/2000 | Kabasawa ................... 369/77.2 |
| 6,055,124 A | * | 4/2000 | Habara et al. ............ 360/99.02 |
| 6,181,510 B1 | * | 1/2001 | Fujiura ..................... 360/99.06 |
| 6,215,753 B1 | * | 4/2001 | Matsumoto ................. 369/77.2 |
| RE37,170 E | * | 5/2001 | Kurosu ....................... 369/77.1 |
| 6,229,781 B1 | * | 5/2001 | Fujisawa ................... 369/77.1 |
| 6,246,654 B1 | * | 6/2001 | Ohmori et al. ............ 369/75.2 |

* cited by examiner

Primary Examiner—Hoa T. Nguyen
Assistant Examiner—Tianjie Chen
(74) Attorney, Agent, or Firm—Greer, Burns & Crain, Ltd.

(57) ABSTRACT

An optical storage device including a light source mounted on a base, an optical head having an objective lens for focusing light from the light source onto an optical recording medium, a spindle motor, and a spindle motor assembly having the spindle motor and movable between a raised position where the spindle motor engages the optical recording medium inserted in the optical storage device and a lowered position where the spindle motor disengages the optical recording medium. The optical storage device further includes a link mechanism for moving the spindle motor assembly between the raised position and the lowered position according to insertion and ejection of the optical recording medium with respect to the optical storage device, and a stopper for engaging the link mechanism to prevent movement of the link mechanism when the optical recording medium is not inserted in the optical storage device, thereby preventing movement of the spindle motor assembly to the raised position.

15 Claims, 14 Drawing Sheets

OPTICAL STORAGE DEVICE AND CARTRIDGE LOADING MECHANISM

BACKGROUND OF THE INVENTION

1. Field of the Invention

The present invention relates generally to an optical storage device, and more particularly to a cartridge loading mechanism for an optical storage device.

2. Description of the Related Art

An optical disk has received attention as a memory medium that becomes a core in the recent rapid development of multimedia, and it is usually accommodated in a cartridge case to be provided as an optical disk cartridge for practical use. The optical disk cartridge is loaded into an optical disk drive to perform reading/writing of data (information) from/to the optical disk by means of an optical pickup (optical head).

A recent optical disk drive intended to realize size reduction is composed of a fixed optical assembly including a laser diode module, a polarization beam splitter for reflecting and transmitting a laser beam, and a photodetector for receiving reflected light from an optical disk, and a movable optical assembly including a carriage and an optical head having an objective lens and a beam raising mirror mounted on the carriage. The carriage is movable in the radial direction of the optical disk along a pair of rails by means of a voice coil motor.

A write-power laser beam emitted from the laser diode module of the fixed optical assembly is first collimated by a collimator lens, next transmitted by the polarization beam splitter, then reflected by the beam raising mirror of the optical head, and finally focused on the optical disk by the objective lens, thereby writing data onto the optical disk. On the other hand, data reading is performed by directing a read-power laser beam onto the optical disk. Reflected light from the optical disk is first collimated by the objective lens, next reflected by the polarization beam splitter of the fixed optical assembly, and finally detected by the photodetector, thereby converting the detected optical signal into an electrical signal.

A conventional cartridge loading mechanism is operated in the following manner. When an optical disk cartridge is inserted into an optical disk drive, a slide plate is pushed to be moved toward the rear end of the optical disk drive by the cartridge. The slide plate is connected through a link mechanism to a spindle motor. When the slide plate is moved as mentioned above, the spindle motor is accordingly raised to chuck a hub of the optical disk, thereby holding the optical disk on the spindle motor. When the spindle motor is operated to rotate the optical disk at a high speed, the optical head is operated to read/write data from/to the optical disk.

However, the conventional cartridge loading mechanism is not provided with a stopper for preventing movement of the spindle motor in its loading direction in the condition that the optical disk cartridge is not inserted in the optical disk drive. Accordingly, when an external shock or the like is applied to the conventional optical disk drive in which the optical disk cartridge is not inserted, there is a possibility that the spindle motor may be moved in the loading direction. When the spindle motor is moved in the loading direction, there arises a problem that the optical disk cartridge may interfere with the spindle motor during insertion of the optical disk cartridge into the optical disk drive.

SUMMARY OF THE INVENTION

It is therefore an object of the present invention to provide an optical storage device which can prevent the movement of the spindle motor in the loading direction when the optical disk cartridge is not inserted in the optical storage device.

In accordance with an aspect of the present invention, there is provided an optical storage device capable of at least reading information recorded on an optical recording medium, comprising: a base; a light source mounted on the base; an optical head having an objective lens for focusing light from the light source onto the optical recording medium; a photodetector mounted on the base for detecting a regenerative signal from reflected light from the optical recording medium; a spindle motor; a spindle motor assembly having the spindle motor and movable between a raised position where the spindle motor engages with the optical recording medium inserted in the optical storage device and a lowered position where the spindle motor disengages the optical recording medium; a link mechanism for moving the spindle motor assembly between the raised position and the lowered position according to insertion and ejection of the optical recording medium with respect to the optical storage device; and a stopper for engaging the link mechanism to prevent movement of the link mechanism when the optical recording medium is not inserted in the optical storage device, thereby preventing movement of the spindle motor assembly to the raised position.

Preferably, the optical storage device further comprises a carriage on which the optical head is mounted, the carriage being movable in a radial direction of the optical recording medium inserted in the optical storage device; and a carriage lock lever for locking the carriage when the optical recording medium is not inserted in the optical storage device. More preferably, the stopper is formed integrally with the carriage lock lever, and when the optical recording medium is inserted into the optical storage device, the carriage lock lever and the stopper are simultaneously released.

More preferably, the optical recording medium is accommodated in a cartridge case and provided as a cartridge; and the link mechanism comprises a slide plate movable between a first position where the cartridge is not inserted in the optical storage device and a second position where the slide plate is pushed to be moved by the cartridge inserted into the optical storage device, and a load plate operatively connected to the slide plate and movable between a third position where the spindle motor assembly is in the lowered position and a fourth position where the spindle motor assembly is in the raised position. More preferably, the load plate has a plurality of lift guides for moving the spindle motor assembly to the raised position according to movement of the load plate from the third position to the fourth position.

In accordance with another aspect of the present invention, there is provided a cartridge loading mechanism in an optical storage device for loading a cartridge including a cartridge case and an optical recording medium accommodated in the cartridge case, comprising: a base; a slide plate movable between a first position where the cartridge is not inserted in the optical storage device and a second position where the slide plate is pushed to be moved by the cartridge inserted into the optical storage device; a spindle motor assembly having a spindle motor and movable between a raised position where the spindle motor engages the optical recording medium of the cartridge inserted in the optical storage device and a lowered position where the spindle motor disengages the optical recording medium; a load plate operatively connected to the slide plate and movable between a third position where the spindle motor assembly is in the lowered position and a fourth position where the spindle motor assembly is in the raised position; and means for locking the load plate at the third position.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
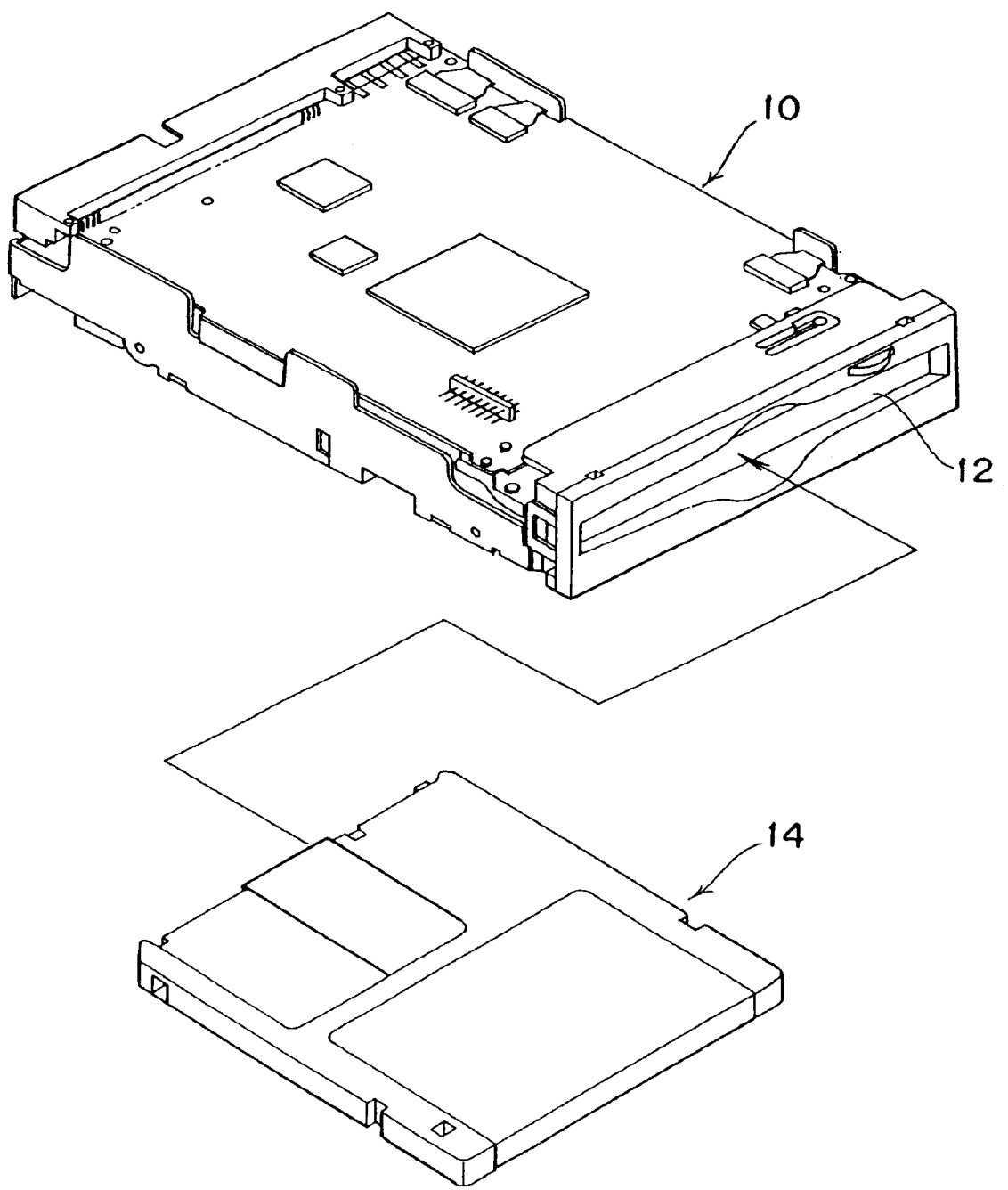
FIG. 1 is an upper perspective view of a magneto-optical disk drive including a cartridge loading mechanism according to the present invention.
Figure 2:
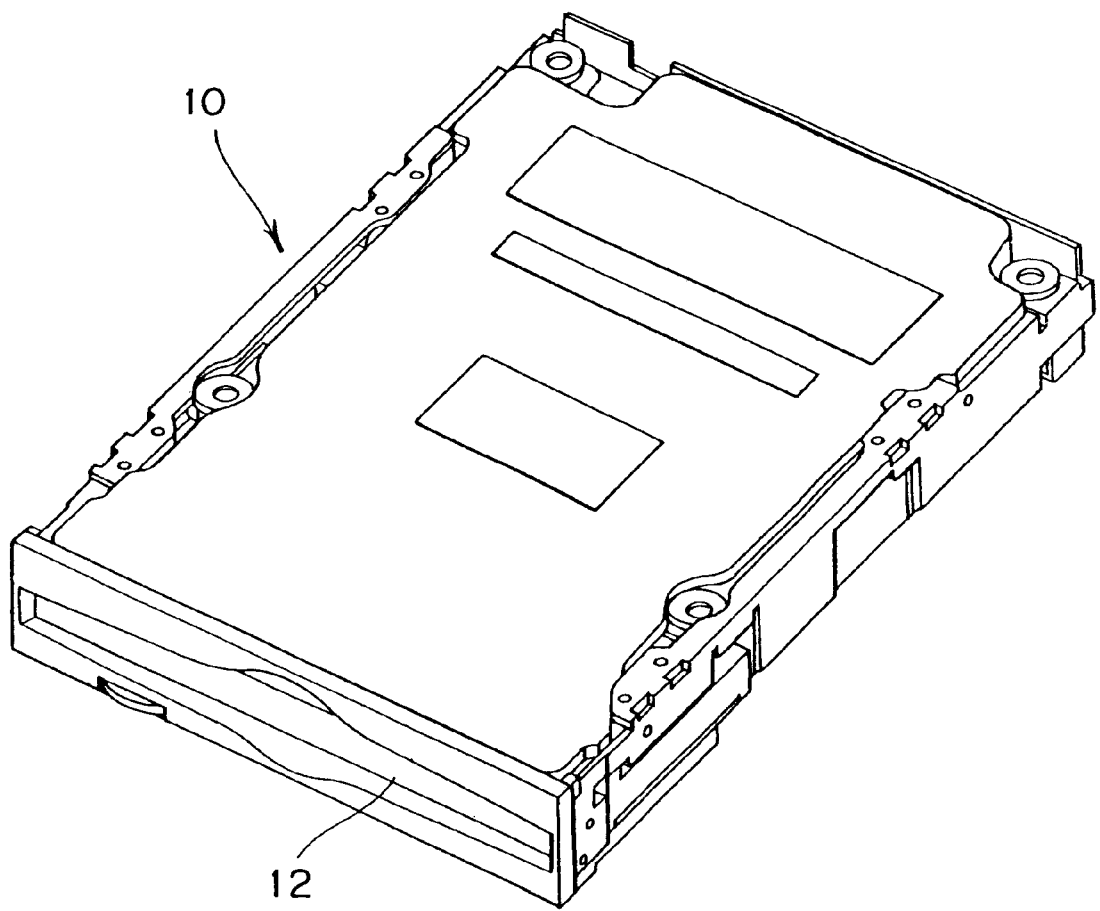
FIG. 2 is a lower perspective view of the magneto-optical disk drive.

Referring to FIG. 1, there is shown a perspective view of a magneto-optical disk drive 10 to which the present invention is applied, as viewed from the upper side. FIG. 2 is a perspective view of the magneto-optical disk drive 10 as viewed from the lower side. The magneto-optical disk drive 10 accepts a magneto-optical disk cartridge 14 having a cartridge case and a magneto-optical disk (both will be hereinafter described) accommodated in the cartridge case, and performs reading/writing of data from/to the magneto-optical disk in the magneto-optical disk cartridge 14.

As will be hereinafter described in detail, the magneto-optical disk drive 10 includes a load/eject mechanism for the magneto-optical disk cartridge 14, a spindle motor for rotating the magneto-optical disk, a bias magnetic field generating mechanism, a positioner, a fixed optical assembly, and a movable optical assembly. The magneto-optical disk drive 10 further has an insert opening 12 for accepting the magneto-optical disk cartridge 14.

Figure 3A:
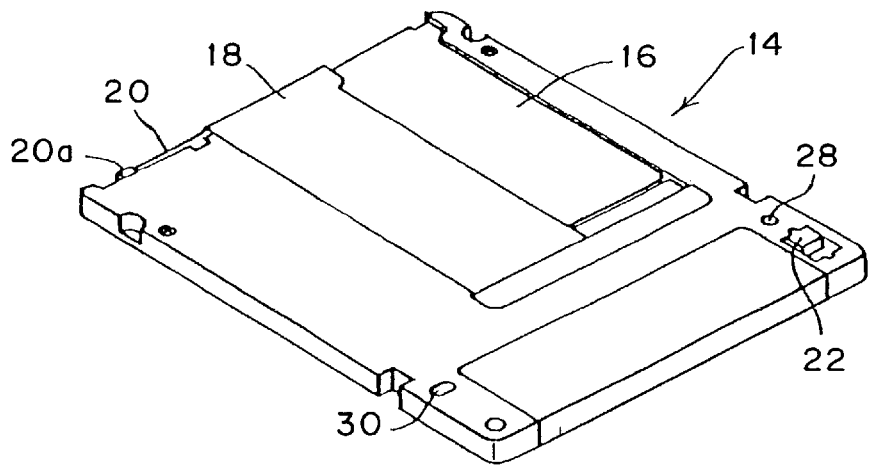
FIG. 3A is a perspective view of a magneto-optical disk cartridge in a shutter closed condition.
Figure 3B:
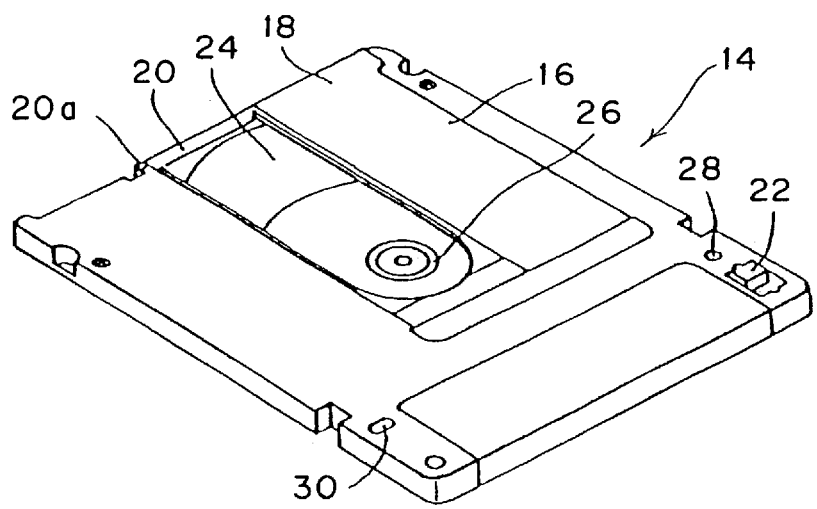
FIG. 3B is a perspective view of the magneto-optical disk cartridge in a shutter opened condition.

FIGS. 3A and 3B are perspective views of the magneto-optical disk cartridge 14 in its different conditions, as viewed from the lower side. It should be noted that FIG. 1 shows the upper side of the magneto-optical disk cartridge 14. As shown in FIG. 3A, the magneto-optical disk cartridge 14 has a cartridge case 16. The cartridge case 16 is provided with a slidable shutter 18. A shutter opening arm 20 is mounted at a front end portion of the shutter 18. A write protector 22 for prohibiting writing onto a magneto-optical disk is provided at a rear end portion of the cartridge case 16.

When an end portion 20a of the shutter opening arm 20 is pushed by a slider to be hereinafter described, the shutter 18 is slid on the cartridge case 16. FIG. 3B shows a condition where the shutter 18 is fully open. As shown in FIG. 3B, a magneto-optical disk 24 as a data recording medium is rotatably accommodated in the cartridge case 16. The magneto-optical disk 24 has a central hub 26 adapted to be chucked for rotation by a spindle motor to be hereinafter described.

Figure 4:
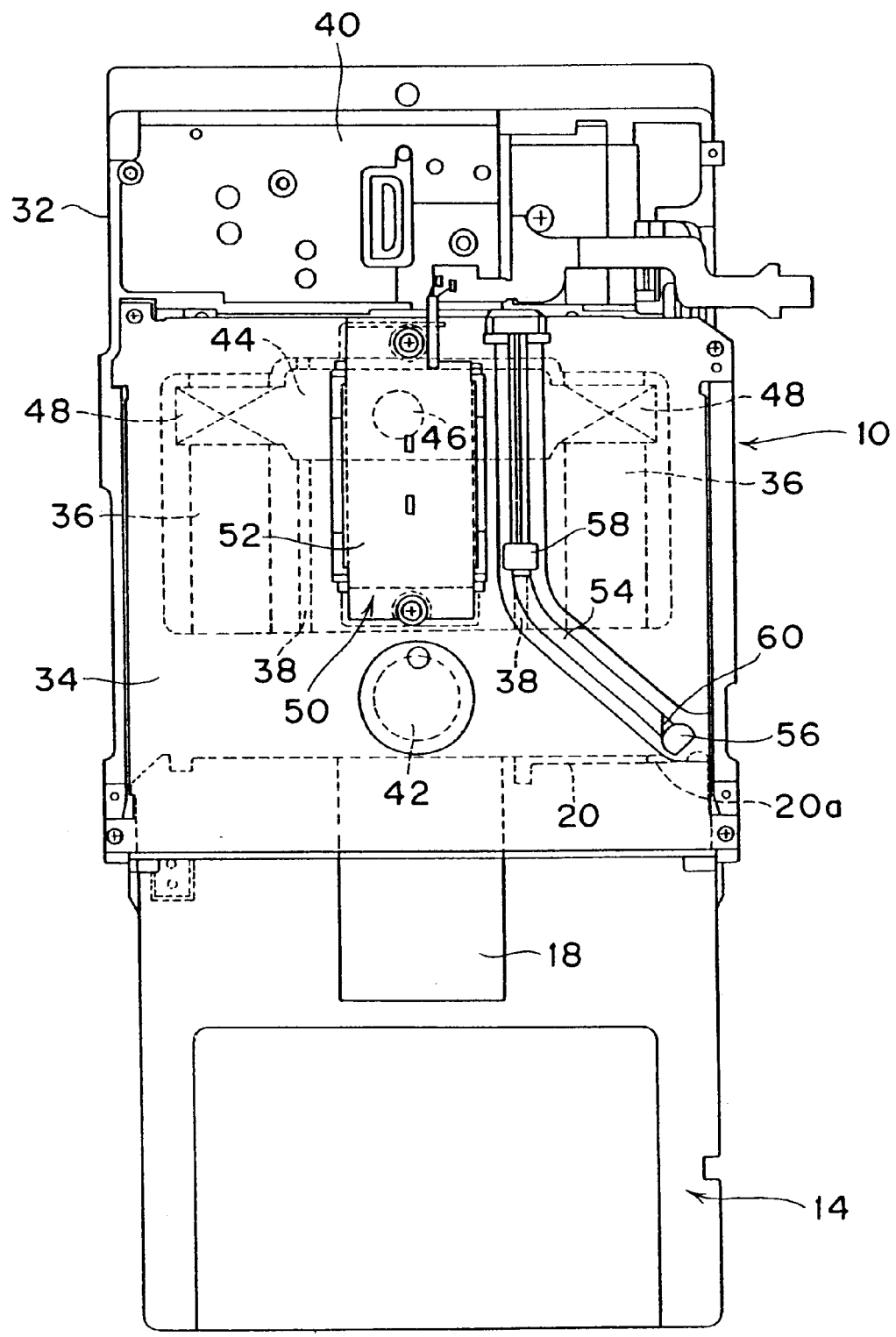
FIG. 4 is a top plan view of the magneto-optical disk drive in the condition where the magneto-optical disk cartridge is slightly inserted in the magneto-optical disk drive.

Two reference holes 28 and 30 for positioning the magneto-optical disk cartridge 14 in the magneto-optical disk drive 10 are formed near the opposite side edges at the rear end portion of the cartridge case 16. The reference hole 28 is a round hole, and the reference hole 30 is an elongated hole. FIG. 4 is a plan view showing a condition where the magneto-optical disk cartridge 14 is slightly inserted in the magneto-optical disk drive 10 from the insert opening 12. Reference numeral 32 denotes a drive base of the magneto-optical disk drive 10. A cartridge holder 34 for holding the magneto-optical disk cartridge 14 inserted into the magneto-optical disk drive 10 is mounted on the drive base 32.

Further mounted on the drive base 32 are a pair of magnetic circuits 36, a pair of guide rails 38, a fixed optical assembly 40 having a laser diode and a photodetector, and a spindle motor 42. Reference numeral 44 denotes a carriage for carrying an optical head 46 having an objective lens. The carriage 44 is provided with a pair of coils 48 at opposite positions respectively corresponding to the pair of magnetic circuits 36. The magnetic circuits 36 and the coils 48 constitute a voice coil motor (VCM). When a current is passed through the coils 48, the carriage 44 is guided by the pair of guide rails 38 to move in the radial direction of the magneto-optical disk 24.

Reference numeral 50 denotes a bias magnetic field generating mechanism including a back yoke 52, a permanent magnet (not shown), and a coil (not shown). The bias magnetic field generating mechanism 50 is mounted on the cartridge holder 34 so as to cover a range of movement of the optical head 46. The cartridge holder 34 is formed with a guide groove 54. The guide groove 54 is composed of a first portion obliquely extending from one end of the insert opening 12 laterally inward of the cartridge holder 34 and a second portion extending from an inward end of the first portion to the rear end of the cartridge holder 34 in parallel to the longitudinal direction of the magneto-optical disk drive 10. A first slider 56 and a second slider 58 are slidably engaged with the guide groove 54. The second slider 58 is connected to the first slider 56 by a spring 60, so that when the first slider 56 is moved, the second slider 58 is moved through the spring 60 to the rear end of the cartridge holder 34.

When the magneto-optical disk cartridge 14 is inserted from the insert opening 12 into the magneto-optical disk drive 10, the first slider 56 comes into abutment against the end portion 20a of the shutter opening arm 20 mounted to the shutter 18 of the magneto-optical disk cartridge 14. During insertion of the magneto-optical disk cartridge 14 into the magneto-optical disk drive 10 from the condition stated as above, the first slider 56 is moved along the guide groove 54 to push the shutter opening arm 20, thereby opening the shutter 18.

Figure 5:
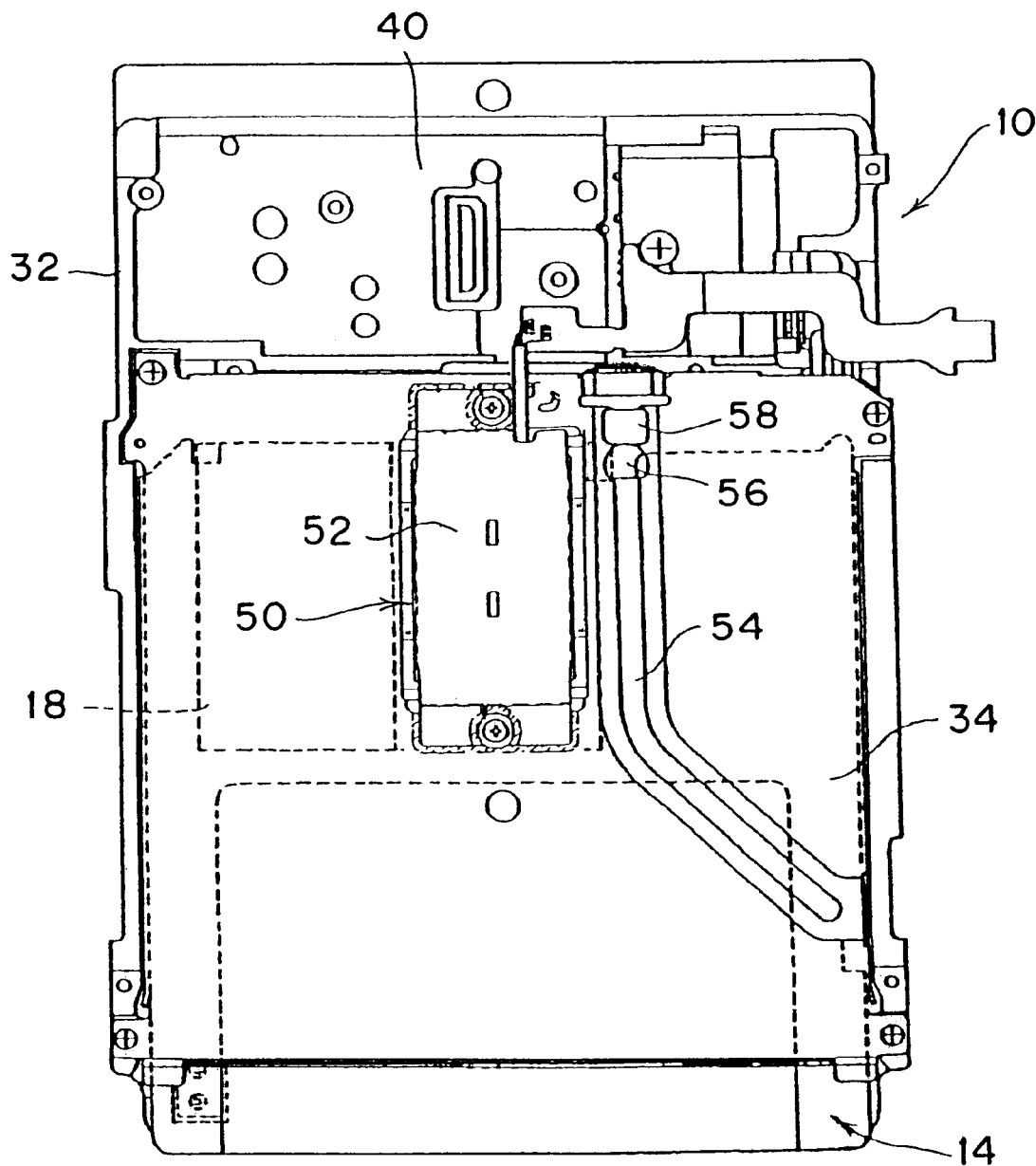
FIG. 5 is a top plan view of the magneto-optical disk drive in the condition where the magneto-optical disk cartridge is fully inserted in the magneto-optical disk drive.

FIG. 5 shows a condition where the magneto-optical disk cartridge 14 is fully inserted into the magneto-optical disk drive 10 from the condition shown in FIG. 4, and the shutter 18 is fully open. In this manner, by inserting the magneto-optical disk cartridge 14 into the magneto-optical disk drive 10, the shutter 18 of the magneto-optical disk cartridge 14 is automatically opened by the first slider 56.

Figure 6:
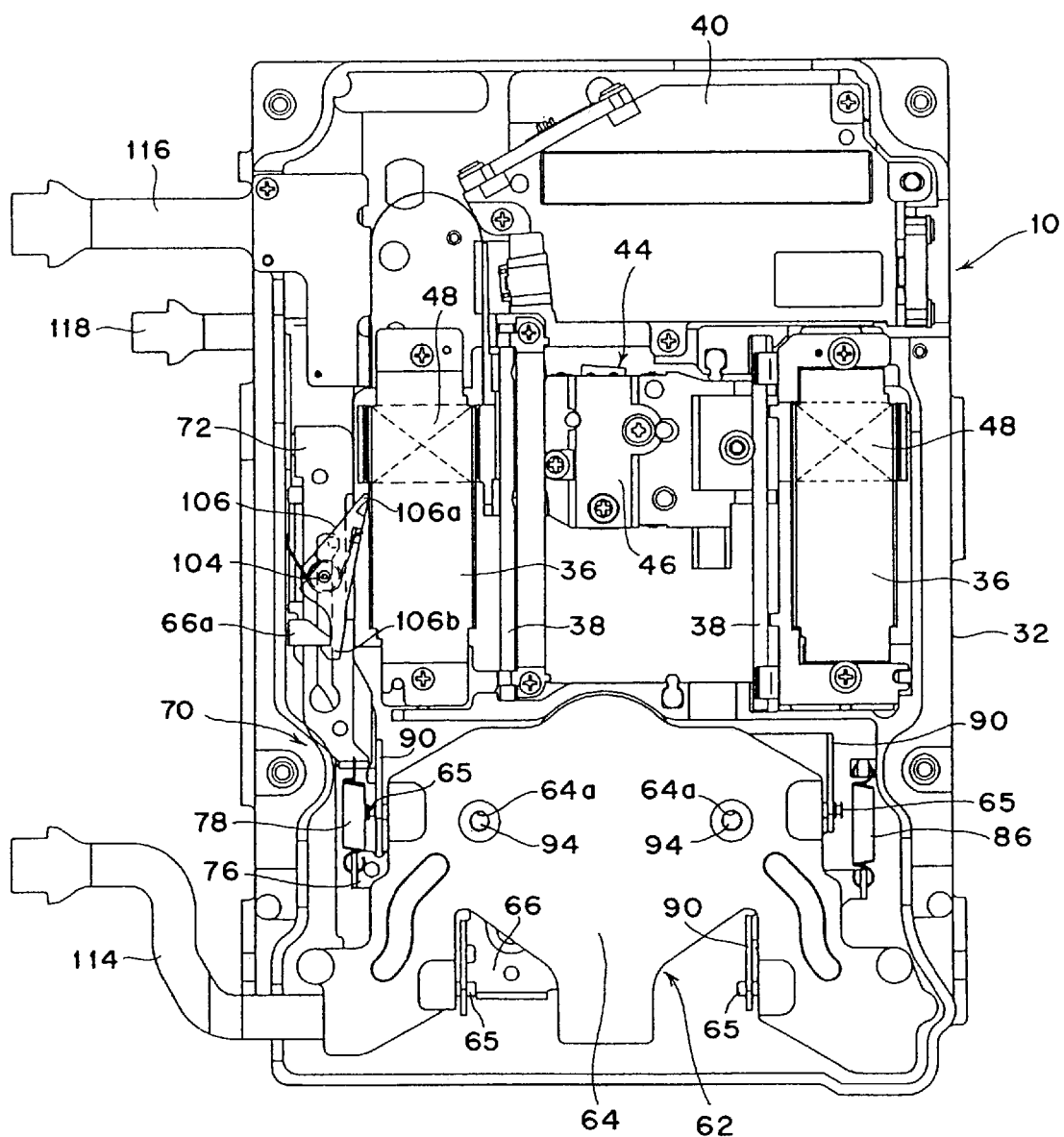
FIG. 6 is a bottom plan view of the magneto-optical disk drive in the condition where the cartridge loading mechanism is in an unloading position.
Figure 8:
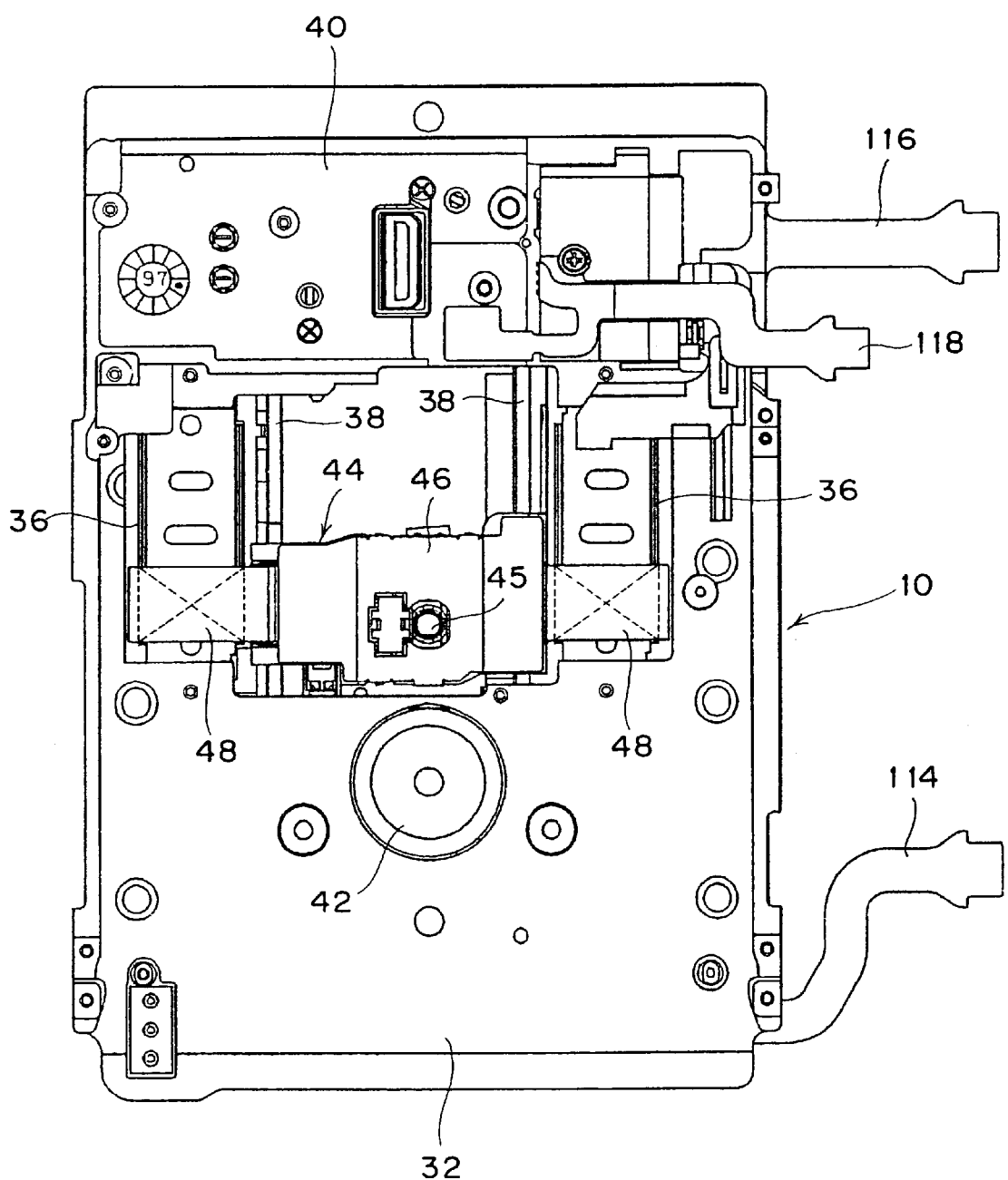
FIG. 8 is a back side view of FIG. 6.
Figure 9:
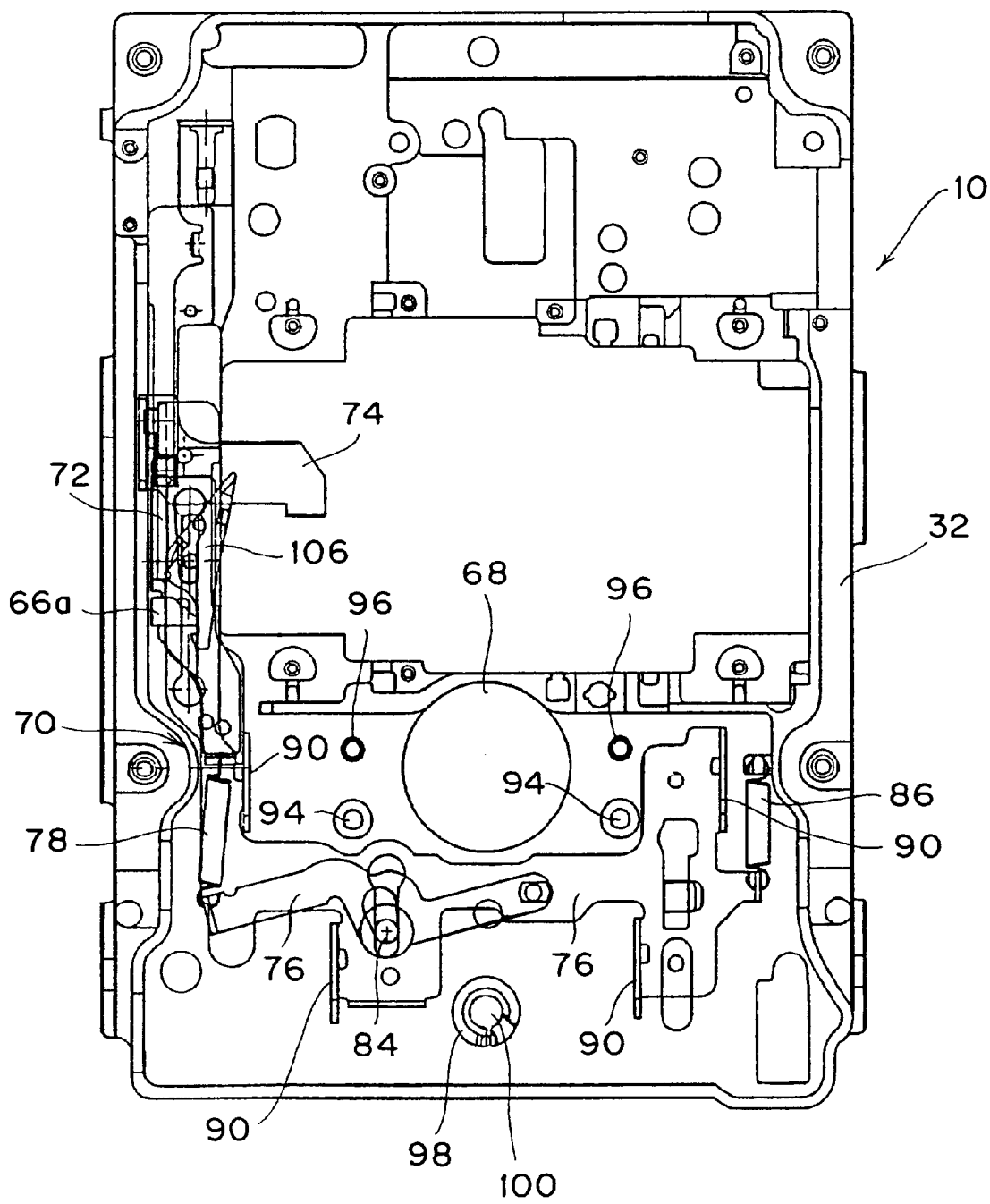
FIG. 9 is a view similar to FIG. 6, showing a condition where a spindle motor assembly and a carriage are removed.

FIG. 6 is a bottom plan view of the magneto-optical disk drive 10, showing an unloading condition of a cartridge loading mechanism, corresponding to FIG. 4. FIG. 8 is a top plan view of the magneto-optical disk drive 10 viewed from bottom side of that shown in FIG. 6, corresponding to FIG. 4, in which the cartridge holder 34 is removed. FIG. 9 shows the cartridge loading mechanism in its unloading condition with the spindle motor 42 and the carriage 44 removed.

Reference numeral 62 denotes a spindle motor assembly having a metal plate 64 such as an iron plate and the spindle motor 42 mounted on the metal plate 64. The spindle motor assembly 62 is movable between a raised position (loading position) where the spindle motor 42 chucks the magneto-optical disk 24 upon insertion of the magneto-optical disk cartridge 14 into the magneto-optical disk drive 10 and a lowered position (unloading position) where the spindle motor 42 releases the magneto-optical disk 24 upon ejection of the magneto-optical disk cartridge 14 out of the magneto-optical disk drive 10.

Figure 10:
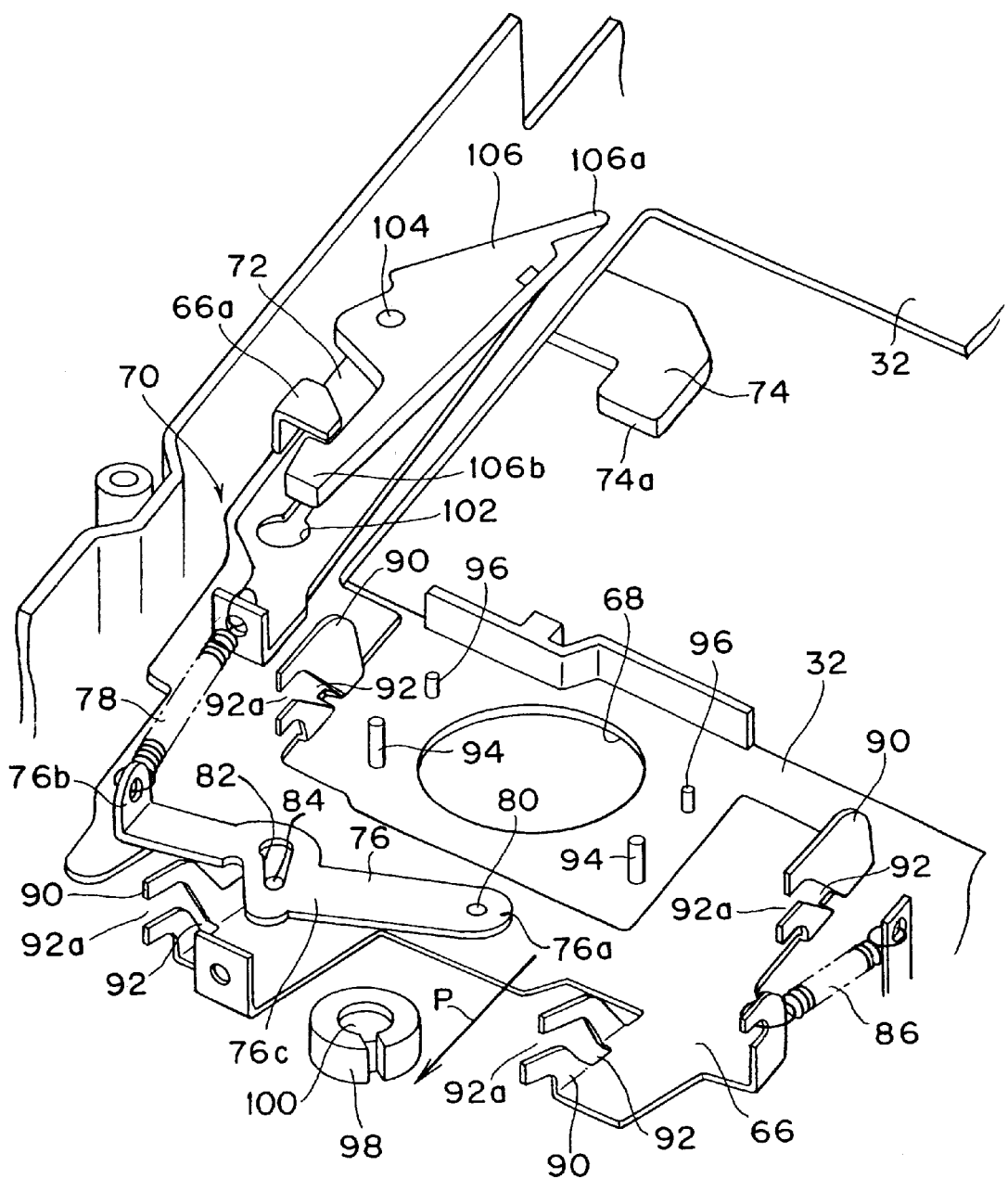
FIG. 10 is an enlarged perspective view of a part of FIG. 9.

When the magneto-optical disk cartridge 14 is inserted into the magneto-optical disk drive 10, the spindle motor assembly 62 is moved to its raised position by a link mechanism 70. As best shown in FIG. 10, the link mechanism 70 includes a load plate 66 for raising the spindle motor assembly 62 to the loading position. The drive base 32 is formed with a hole 68 for insertion of the spindle motor 42.

The link mechanism 70 further includes a slide plate 72 to be moved in the longitudinal direction of the magneto-optical disk drive 10 by a guide (not shown). A cartridge receiving block 74 is integrally connected to the slide plate 72, so that the magneto-optical disk cartridge 14 inserted into the magneto-optical disk drive 10 abuts against an abutment surface 74a of the cartridge receiving block 74.

A lever 76 is pivotably connected at its one end portion 76a to the load plate 66 by a pivot pin 80. A coil spring 78 extends under tension between another end portion 76b of the lever 76 and the slide plate 72. The lever 76 is formed at its intermediate portion 76c with a hole 82, and a pivot pin 84 fixed to the drive base 32 is inserted in the hole 82. A coil spring 86 extends under tension between the load plate 66 and the drive base 32 at a position laterally opposite to the position of the coil spring 78.

The load plate 66 is integrally formed with four lift guides 90. Each lift guide 90 has an inclined slot 92. The slot 92 has an end portion 92a extending in parallel to the load plate 66. The spindle motor assembly 62 has four pins 65 projecting horizontally. These four pins 65 are respectively inserted through the slots 92 of the four lift guides 90, thereby mounting the spindle motor assembly 62 on the load plate 66.

The metal plate 64 of the spindle motor assembly 62 is formed with a pair of holes 64a, and a pair of pins 94 fixed to the drive base 32 are respectively inserted in the pair of holes 64a. A pair of projections 96 and an annular projection 98 each abutting against the metal plate 64 of the spindle motor assembly 62 raised to the loading position are also fixed to the drive base 32. A permanent magnet 100 is accommodated inside the annular projection 98.

Figure 7:
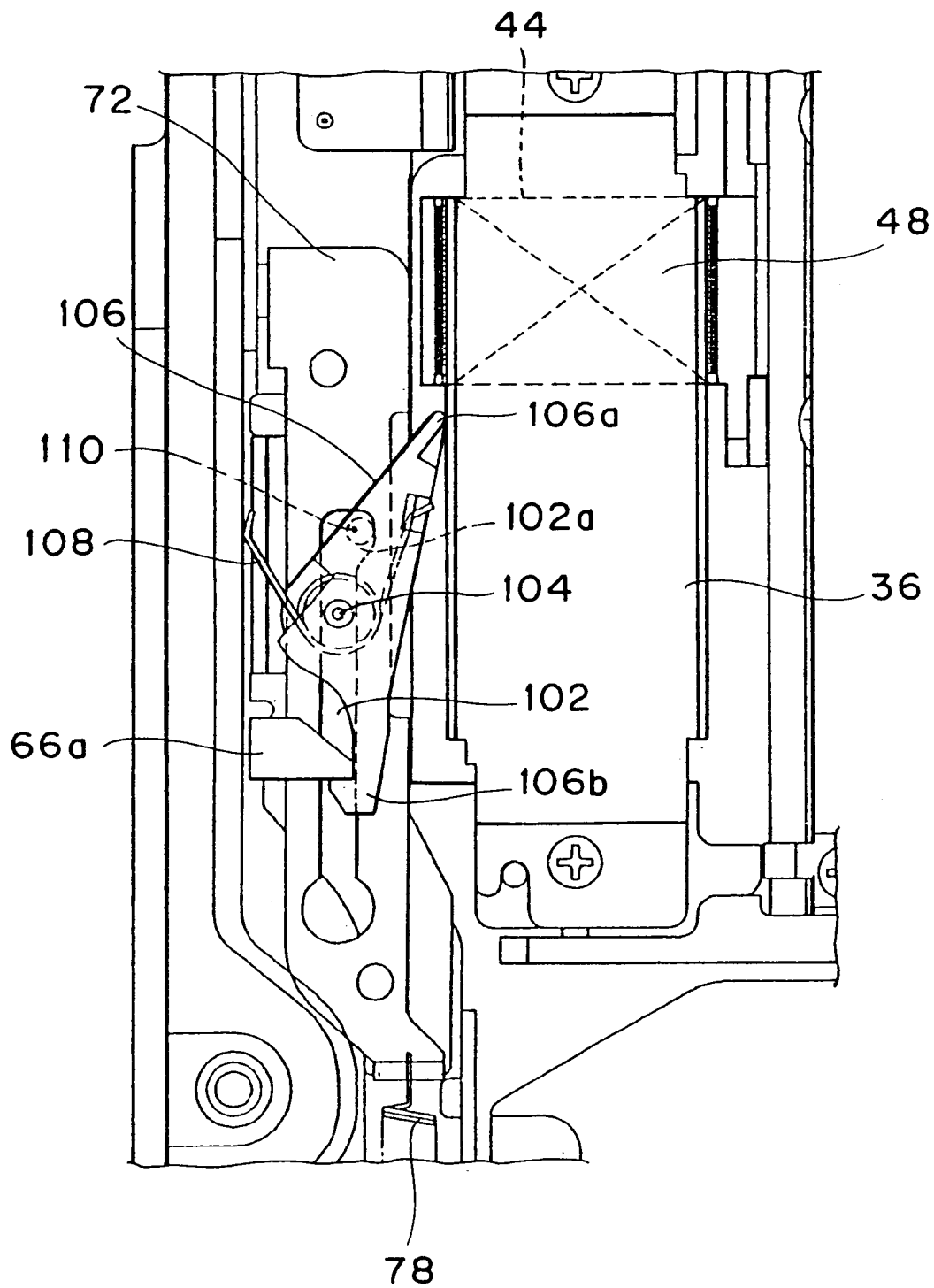
FIG. 7 is an enlarged plan view of a part of FIG. 6.

As best shown in FIG. 7, the slide plate 72 is formed with a slit 102 extending in the longitudinal direction of the magneto-optical disk drive 10. The slit 102 has an end portion 102a enlarged in width. A pin 104 fixed to the drive base 32 is inserted through the slit 102, and a carriage lock lever 106 is pivotably mounted on the pin 104.

The carriage lock lever 106 is integrally formed with a projection 110 projecting from its back surface. In the unloading condition, the projection 110 is positioned in the enlarged end portion 102a of the slit 102. The carriage lock lever 106 is biased clockwise as viewed in FIG. 7 by a torsion spring 108 mounted on the pin 104, so that an end portion 106a of the carriage lock lever 106 abuts against one of the magnetic circuits 36 to thereby prevent movement of the carriage 44 along the guide rails 38. Thus, the carriage 44 is locked in the unloading condition.

The carriage lock lever 106 is further integrally formed at its other end with a hook portion 106b. In the unloading condition shown in FIG. 7, the hook portion 106b is engaged with an engaging member 66a formed integrally with the load plate 66. Accordingly, in the unloading condition where the magneto-optical disk cartridge 14 is not inserted in the magneto-optical disk drive 10, the hook portion 106b functions as a stopper for preventing movement of the load plate 66 in its loading direction. Accordingly, the spindle motor assembly 62 mounted on the load plate 66 is maintained at the unloading position lowered from the drive base 32, and is therefore prevented from moving in the loading direction.

Figure 14A:
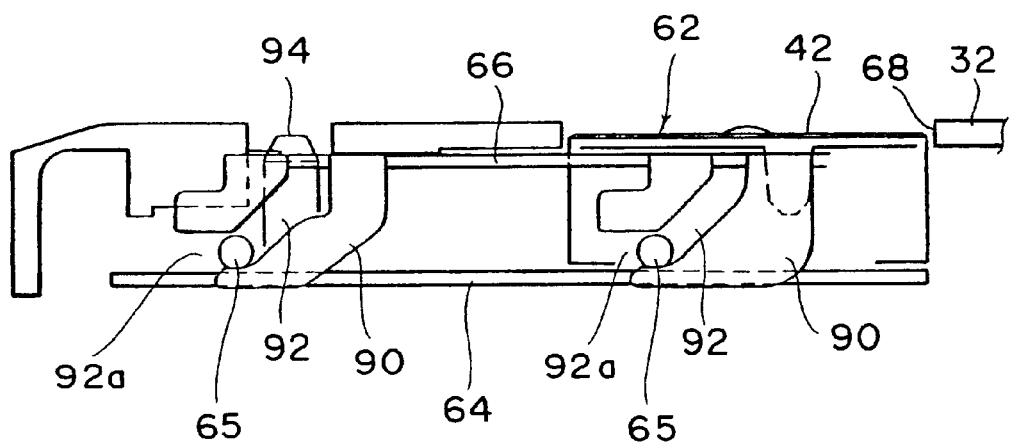
FIG. 14A is a side view showing a positional relation between a drive base and the spindle motor assembly in its unloading position.
Figure 14B:
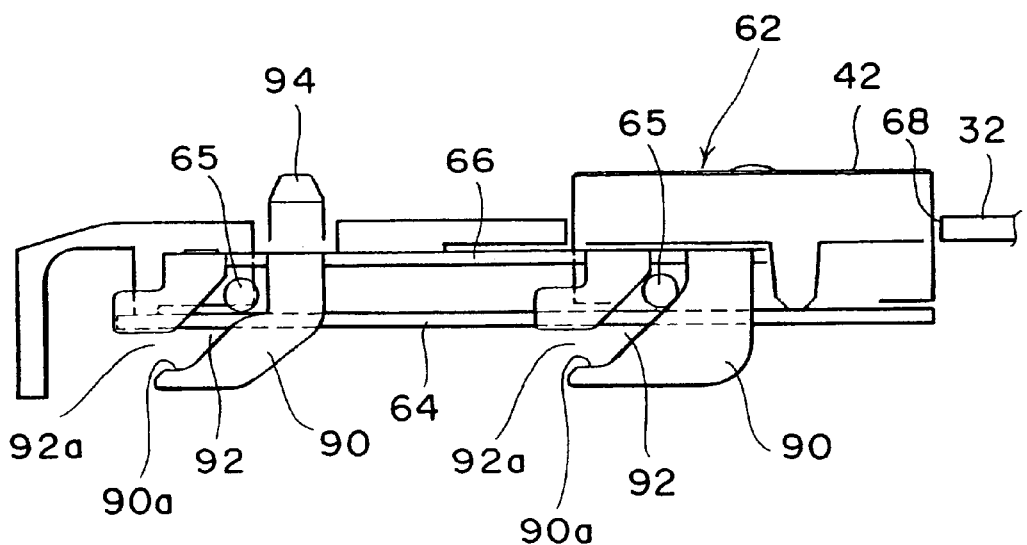
FIG. 14B is a side view showing a positional relation between the drive base and the spindle motor assembly in its loading position.

FIG. 14A shows a positional relation between the drive base 32 and the spindle motor assembly 62 in the unloading condition. FIG. 14B shows a positional relation between the drive base 32 and the spindle motor assembly 62 in the loading condition. As shown in FIG. 14A, the pins 65 of the spindle motor assembly 62 are inserted in the horizontal end portions 92a of the slots 92 of the respective lift guides 90 in the unloading condition. That is, the pins 65 are respectively supported by horizontal end portions 90a of the lift guides 90 defining the horizontal end portions 92a of the slots 92. Accordingly, the spindle motor 42 is maintained in the unloading position where it is retracted from the drive base 32.

When the magneto-optical disk cartridge 14 is inserted into the magneto-optical disk drive 10, the magneto-optical disk cartridge 14 comes into abutment against the abutment surface 74a of the cartridge receiving block 74 to push the cartridge receiving block 74, so that the slide plate 72 is moved toward the rear end of the magneto-optical disk drive 10. As a result, the projection 110 of the carriage lock lever 106 is relatively moved from the enlarged end portion 102a of the slit 102 to a straight portion of the slit 102 as best shown in FIG. 13.

Figure 12:
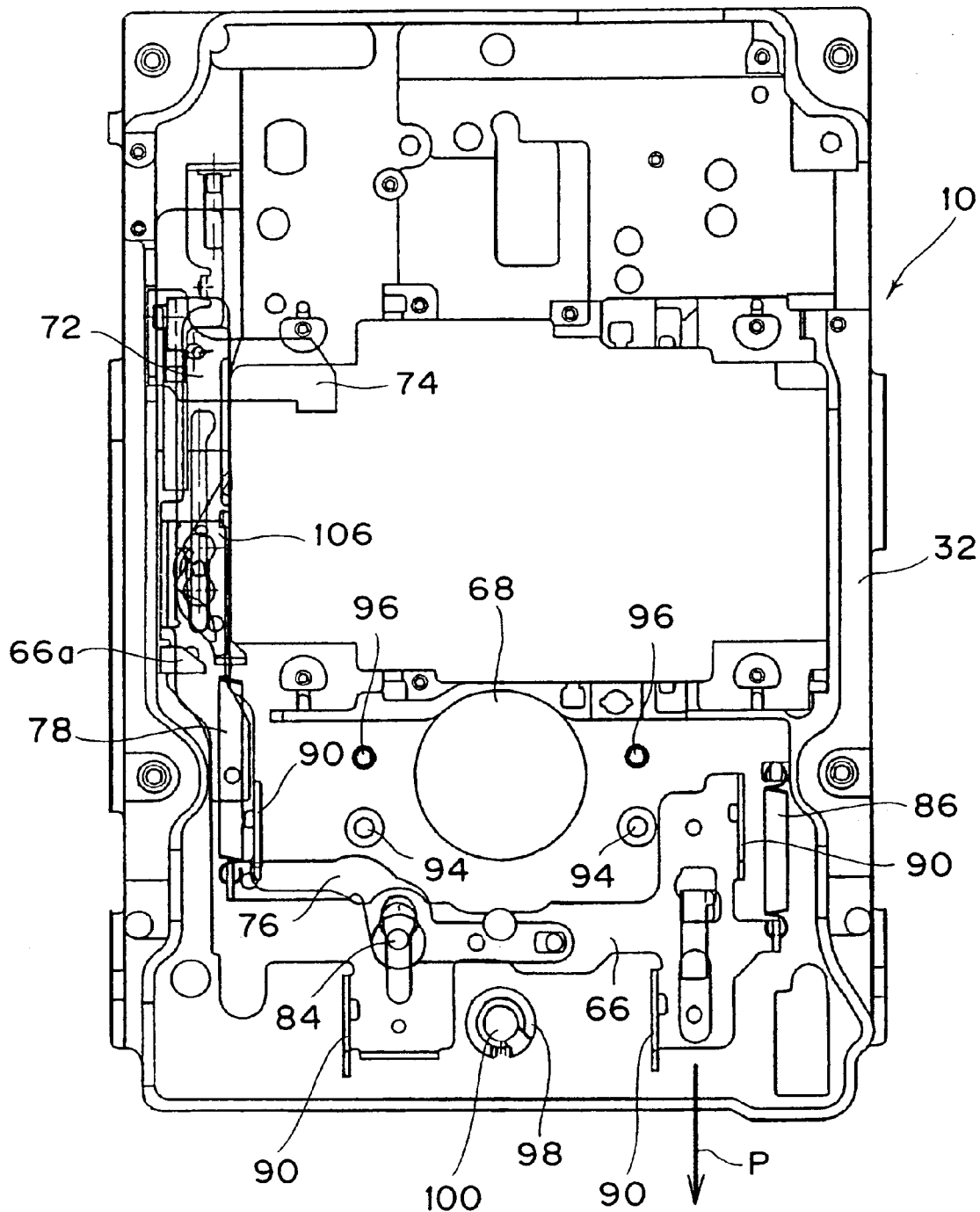
FIG. 12 is a view similar to FIG. 11, showing a condition where the spindle motor assembly and the carriage are removed.
Figure 13:
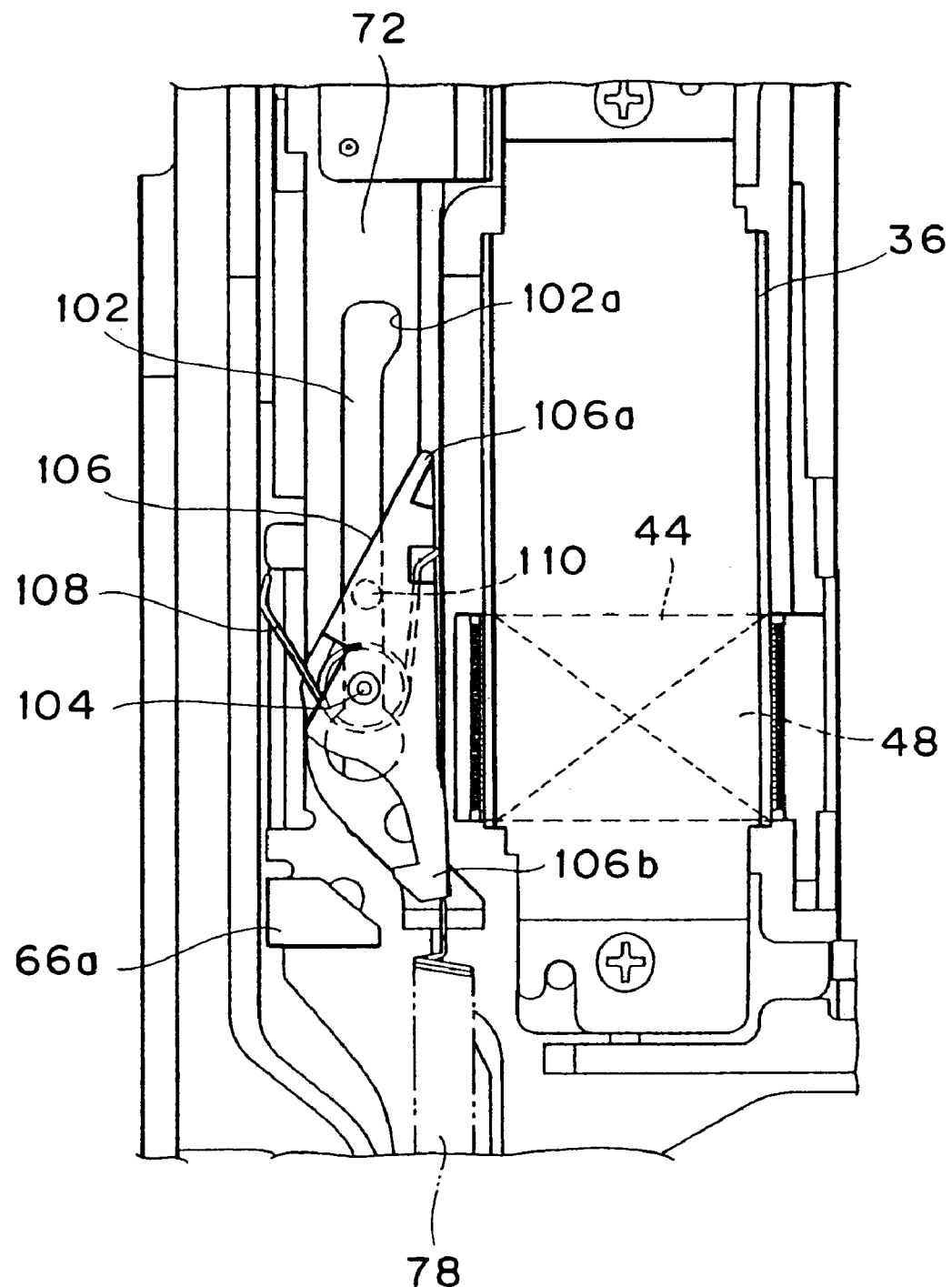
FIG. 13 is an enlarged plan view of a part of FIG. 12.

As a result, the carriage lock lever 106 is slightly pivoted about the pin 104 in the counterclockwise direction as viewed in FIG. 13 against the biasing force of the torsion spring 108 to unlock the carriage 44 and cancels the engagement of the hook portion 106b and the engaging member 66a. With the rearward movement of the slide plate 72 as mentioned above, the coil spring 78 is expanded to pivot the lever 76 about the pin 84 in the clockwise direction as viewed in FIG. 12. As a result, the coil springs 78 and 86 are expanded and the load plate 66 is moved in the direction P shown in FIGS. 10 and 12.

When the load plate 66 is moved in the direction P, the pins 65 of the spindle motor assembly 62 are moved within the inclined slots 92 of the respective lift guides 90 until the spindle motor 42 projects from the hole 68 of the drive base 32 to reach the loading position. In this loading position, the hub 26 of the magneto-optical disk 24 is magnetically attracted to a magnet provided on a turntable of the spindle motor 42.

Figure 11:
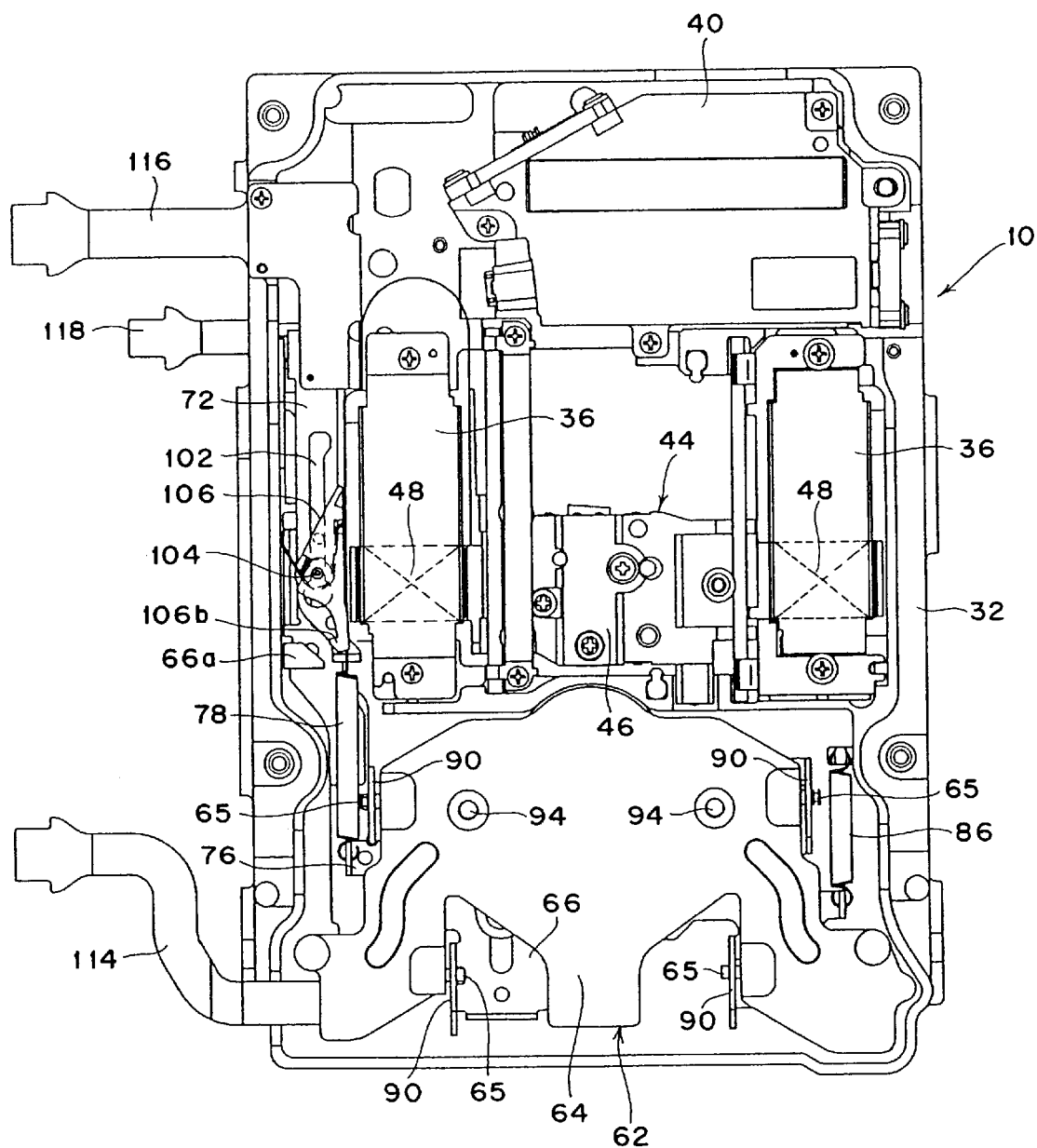
FIG. 11 is a bottom plan view of the magneto-optical disk drive in the condition where the cartridge loading mechanism is in a loading position.

FIG. 11 shows such a loading condition of the cartridge loading mechanism. FIG. 12 is similar to FIG. 11 except that the spindle motor assembly 62 and the carriage 44 are removed. In the loading condition, the metal plate 64 of the spindle motor assembly 62 abuts against the pair of projections 96 and the annular projection 98 fixed to the drive base 32, thereby fixing the spindle motor 42 at the given loading position with respect to the drive base 32.

Referring to FIGS. 6 and 11, a flexible printed circuit sheet (FPC) 114 is connected to the spindle motor 42; an FPC 116 is connected to the coils 48 of the carriage 44; and an FPC 118 is connected to the coil of the bias magnetic field generating mechanism 50. Having thus described a specific preferred embodiment of the present invention applied to a magneto-optical disk drive, the present invention is not limited to the above preferred embodiment, but similarly applicable to any other optical disk drives in which an optical disk is selectively loaded to a spindle motor.

According to the present invention as described above, when the cartridge is not inserted in the optical disk drive, the carriage lock lever for locking the carriage functions as a stopper for preventing the movement of the spindle motor in the loading direction. Accordingly, the movement of the spindle motor in the loading direction due to an external shock or the like can be effectively prevented without the need for newly providing any lock mechanism for the spindle motor.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical storage device capable of at least reading information recorded on an optical recording medium, comprising:

a base;

a light source mounted on said base;

an optical head having an objective lens for focusing light from said light source onto said optical recording medium;

a photodetector mounted on said base for detecting a reproducing signal from reflected light from said optical recording medium;

a spindle motor assembly having a spindle motor and movable between a raised position where said spindle motor engages said optical recording medium inserted in said optical storage device and a lowered position where said spindle motor disengages said optical recording medium;

a link mechanism for moving said spindle motor assembly between said raised position and said lowered position according to insertion and ejection of said optical recording medium with respect to said optical storage device, wherein said link mechanism includes a slide plate movable between a first position where a cartridge accommodating said optical recording medium is not inserted in said optical storage device and a second position where said slide plate is pushed to be moved by said cartridge inserted into said optical storage device, and a load plate operatively connected to said slide plate and movable between a third position where said spindle motor assembly is in said lowered position and a fourth position where said spindle motor assembly is in said raised position, said load plate having an engaging member integrally formed therewith;

a lock lever for engaging said engaging member of said load plate to lock said load plate at said third position when said cartridge is not inserted in said optical storage device, thereby preventing movement of said spindle motor assembly to said raised position, said lock lever being pivotally mounted between an engaging position where said lock lever engages said engaging member and a disengaging position where said lock lever disengages said engaging member; and means for biasing said lock lever towards said engaging position.

2. An optical storage device according to claim 1, further comprising:

a carriage on which said optical head is mounted, said carriage being movable in a radial direction of said optical recording medium inserted in said optical storage device; and a carriage lock lever for locking said carriage when said optical recording medium is not inserted in said optical storage device.

3. An optical storage device capable of at least reading information recorded on an optical recording medium, comprsing:

a base;

a light source mounted on said base;

an optical head having an objective lens for focusing light from said light source onto said optical recording medium;

a photodetector mounted on said base for detecting a reproducing signal from reflected light from said optical recording medium;

a spindle motor assembly having a spindle motor and movable between a raised position where said spindle motor engages said optical recording medium inserted in said optical storage device and a lowered position where said spindle motor disengages said optical recording medium;

a link mechanism for moving said spindle motor assembly between said raised position and said lowered position according to insertion and ejection of said optical recording medium with respect to said optical storage device;

a stopper for engaging said link mechanism to prevent movement of said link mechanism when said optical recording medium is not inserted in said optical storage device, thereby preventing movement of said spindle motor assembly to said raised position, a carriage on which said optical head is mounted, said carriage being movable in a radial direction of said optical recording medium inserted in said optical storage device; and a carriage lock lever for locking said carriage when said optical recording medium is not inserted in said optical storage device, wherein said stopper is formed integrally with said carriage lock lever, and when said optical recording medium is inserted into said optical storage device, said carriage lock lever and said stopper are simultaneously released.

4. An optical storage device according to claim 3, wherein:

said optical recording medium is accommodated in a cartridge case and provided as a cartridge; and said link mechanism includes a slide plate movable between a first position where said cartridge is not inserted in said optical storage device and a second position where said slide plate is pushed to be moved by said cartridge inserted into said optical storage device, and a load plate operatively connected to said slide plate and movable between a third position where said spindle motor assembly is in said lowered position and a fourth position where said spindle motor assembly is in said raised position.

5. An optical storage device according to claim 4, wherein said load plate has a plurality of lift guides for moving said spindle motor assembly to said raised position according to movement of said load plate from said third position to said fourth position.

6. A cartridge loading mechanism in an optical storage device for loading a cartridge including a cartridge case and an optical recording medium accommodated in said cartridge case, comprising:

a base;

a slide plate including an elongated slit with a widened portion, said slide plate being movable between a first position where said cartridge is not inserted in said optical storage device and a second position where said slide plate is pushed to be moved by said cartridge inserted into said optical storage device;

a spindle motor assembly having a spindle motor and movable between a raised position where said spindle motor engages said optical recording medium of said cartridge inserted in said optical storage device and a lowered position where said spindle motor disengages said optical recording medium;

a load plate operatively connected to said slide plate and movable between a third position where said spindle motor assembly is in said lowered position and a fourth position where said spindle motor assembly is in said raised position;

a lock lever for locking said load plate at said third position when said optical recording medium is not inserted in said optical storage device, thereby preventing movement of said spindle motor assembly to said raised position, said lock lever being pivotally mounted between a lock position where said lock lever locks said load plate at said third position and an unlock position, said lock lever including a projection that extends into said slit of said slide plate; and means for biasing said lock lever towards said lock position;

wherein movement of said slide plate from said first position to said second position causes said projection to move out of said widened portion, causing said lock lever to pivot into said unlock position.

7. A cartridge loading mechanism in an optical storage device for loading a cartridge including a cartridge case and an optical recording medium accommodated in said ridge case, comprising:

a base;

a slide plate movable between a first position where said cartridge is not inserted in said optical storage device and a second position where said slide plate is pushed to be moved by said cartridge inserted into said optical storage device;

a spindle motor assembly having a spindle motor and movable between a raised position where said spindle motor engages said optical recording medium of said cartridge inserted in said optical storage device and a lowered position where said spindle motor disengages said optical recording medium;

a load plate operatively connected to said slide plate and movable between a third position where said spindle motor assembly is in said lowered position and a fourth position where said spindle motor assembly is in said raised position;

means for locking said load plate at said third position; and a carriage lock lever for locking a carriage on which an optical head is mounted, when said cartridge is not inserted in said optical storage device;

said locking means being formed integrally with said carriage lock lever.

8. A cartridge loading mechanism according to claim 7, wherein when said slide plate is pushed to be moved to said second position by said cartridge inserted into said optical storage device, said locking means is released to allow movement of said load plate to said fourth position, thereby moving said spindle motor assembly to said raised position.

9. A cartridge loading mechanism according to claim 7, further comprising:

a lever having one end pivotably connected to said load plate and an intermediate portion pivotably mounted to said base; and a coil spring for connecting the other end of said lever to said slide plate;

said load plate having a plurality of lift guides, wherein when said slide plate is moved to said second position, said lever is pivoted to move said load plate to said fourth position and thereby move said spindle motor assembly to said raised position through said lift guides.

10. A cartridge loading mechanism according to claim 9, further comprising:

a plurality of guide pins fixed to said base;

said spindle motor assembly further having a metal plate formed with a plurality of guide holes respectively engaging with said plurality of guide pins;

said spindle motor assembly being moved between said lowered position and said raised position with said guide pins inserted through said guide holes.

11. An optical storage device capable of at least reading information recorded on an optical recording medium, comprising:

a base;

a slide plate including an elongated slit with a widened portion, said slide plate being movable between a first position where a cartridge accommodating said optical storage medium is not inserted in said optical storage device and a second position where said slide plate is pushed to be moved by said cartridge inserted into said optical storage device;

a spindle motor assembly having a spindle motor and movable between a raised position where said spindle motor engages said optical recording medium of said cartridge inserted in said optical storage device and a lowered position where said spindle motor disengages said optical recording medium;

a load plate operatively connected to said slide plate and movable between a third position where said spindle motor assembly is in said lowered position and a fourth position where said spindle motor assembly is in said raised position;

a lock lever for locking said load plate at said third position when said cartridge is not inserted in said optical storage device, thereby preventing movement of said spindle motor assembly to said raised position, said lock lever being pivotally mounted between a lock position where said lock lever locks said load plate at said third position and an unlock position, said lock lever including a projection that extends into said slit of said slide plate; and means for biasing said lock lever towards said lock position;

wherein movement of said slide plate from said first position to said second position causes said projection to move out of said widened portion, causing said lock lever to pivot into said unlock position.

12. An optical storage device capable of at least reading information recorded on an optical recording medium, comprising:

a base;

a slide plate movable between a first position where a cartridge accommodating said optical recording medium is not inserted in said optical storage device and a second position where said slide plate is pushed to be moved by said cartridge inserted into said optical storage device;

a spindle motor assembly having a spindle motor and movable between a raised position where said spindle motor engages said optical recording medium of said cartridge inserted in said optical storage device and a lowered position where said spindle motor disengages said optical recording medium;

a load plate operatively connected to said slide plate and movable between a third position where said spindle motor assembly is in said lowered position and a fourth position where said spindle motor assembly is in said raised position;

means for locking said load plate at said third position; and a carriage lock lever for locking a carriage on which an optical head is mounted, when said cartridge is not inserted in said optical storage device;

said locking means being formed integrally with said carriage lock lever.

13. An optical storage device according to claim 12, wherein when said slide plate is pushed to be moved to said second position by said cartridge inserted into said optical storage device, said locking means is released to allow movement of said load plate to said fourth position, thereby moving said spindle motor assembly to said raised position.

14. An optical storage device according to claim 12, further comprising:

a lever having one end pivotably connected to said load plate and an intermediate portion pivotally mounted to said base; and a coil spring for connecting the other end of said lever to said slide plate;

said load plate having a plurality of lift guides, wherein when said slide plate is moved to said second position, said lever is pivoted to move said load plate to said fourth position and thereby move said spindle motor assembly to said raised position through said lift guides.

15. An optical storage device according to claim 14, further comprising:

a plurality of guide pins fixed to said base;

said spindle motor assembly further having a metal plate formed with a plurality of guide holes respectively engaging with said plurality of guide pins;

said spindle motor assembly being moved between said lowered position and said raised position with said guide pins inserted through said guide holes.

\* \* \* \* \*

UNITED STATES PATENT AND TRADEMARK OFFICE
CERTIFICATE OF CORRECTION

PATENT NO.    : 6,512,728 B1
DATED         : January 28, 2003
INVENTOR(S)   : Nasu et al.

It is certified that error appears in the above-identified patent and that said Letters Patent is hereby corrected as shown below:

<u>Title page,</u>
Item [56], References Cited, insert:
-- FOREIGN PATENT DOCUMENTS
JP 503,844  11/1993  Kageyama et al. --

Signed and Sealed this

Fourth Day of November, 2003

JAMES E. ROGAN
*Director of the United States Patent and Trademark Office*